United States Patent
Itou

(10) Patent No.: US 9,519,337 B2
(45) Date of Patent: Dec. 13, 2016

(54) CIRCUITRY FOR CONTROLLING AN OUTPUT FROM AN ELECTRONIC CONTROL UNIT INCLUDING TWO PROCESSORS MUTUALLY MONITORING EACH OTHER

(71) Applicant: DENSO CORPORATION, Kariya, Aichi-pref. (JP)

(72) Inventor: Akito Itou, Kariya (JP)

(73) Assignee: DENSO CORPORATION, Kariya (JP)

( * ) Notice: Subject to any disclaimer, the term of this patent is extended or adjusted under 35 U.S.C. 154(b) by 138 days.

(21) Appl. No.: 14/496,084

(22) Filed: Sep. 25, 2014

(65) Prior Publication Data
US 2015/0100811 A1 Apr. 9, 2015

(30) Foreign Application Priority Data

Oct. 9, 2013 (JP) .................................. 2013-212285

(51) Int. Cl.
G06F 1/00 (2006.01)
G06F 11/30 (2006.01)
G06F 1/32 (2006.01)

(52) U.S. Cl.
CPC ........... *G06F 1/3293* (2013.01); *G06F 1/3203* (2013.01); *G06F 1/3243* (2013.01); *G06F 1/3287* (2013.01); *G06F 1/3296* (2013.01); *Y02B 60/1207* (2013.01); *Y02B 60/165* (2013.01)

(58) Field of Classification Search
CPC ........ G06F 1/3203; G06F 1/3287; G06F 1/32; G06F 1/3296; G06F 1/3243
See application file for complete search history.

(56) References Cited

U.S. PATENT DOCUMENTS

| 6,351,823 B1 | 2/2002 | Mayer et al. |
| 2009/0183018 A1 | 7/2009 | Nakamura et al. |
| 2009/0281689 A1 | 11/2009 | Suganuma et al. |
| 2011/0113275 A1 | 5/2011 | Kondo |
| 2013/0185574 A1 | 7/2013 | Nishikawa |

FOREIGN PATENT DOCUMENTS

| JP | 4-283841 A | 10/1992 |
| JP | 10252539 A | 9/1998 |
| JP | 2006-053656 A | 2/2006 |
| JP | 2007-030593 A | 2/2007 |

OTHER PUBLICATIONS

OA dated Aug. 18, 2015 issued in the corresponding JP application No. 2013-212285.

*Primary Examiner* — Xuxing Chen
(74) *Attorney, Agent, or Firm* — Posz Law Group, PLC

(57) ABSTRACT

An electronic control unit of one embodiment includes first and second microcomputers for mutually monitoring operations, an output circuit for outputting a signal that is outputted from at least one of the first and second microcomputers, a power supply circuit for supplying electric power to the output circuit, and a stop unit for stopping supply of the electric power from the power supply circuit to the output circuit. The first microcomputer has operation modes including a normal mode and a low power mode. In the low power mode, the first microcomputer stops monitoring the operation of the second microcomputer and outputs a power supply stop signal that operates the stop unit to stop the supply of the electric power from the power supply circuit to the output circuit.

4 Claims, 6 Drawing Sheets

CIRCUITRY FOR CONTROLLING AN OUTPUT FROM AN ELECTRONIC CONTROL UNIT INCLUDING TWO PROCESSORS MUTUALLY MONITORING EACH OTHER

CROSS REFERENCE TO RELATED APPLICATION

The present application is based on Japanese Patent Application No. 2013-212285 filed on Oct. 9, 2013, disclosure of which is incorporated herein by reference.

TECHNICAL FIELD

The present disclosure relates to an electronic control unit including a first microcomputer and a second microcomputer mutually monitoring operations of their counterparties.

BACKGROUND

For example, Patent Document 1 shows a configuration in which a first processor monitors an operation of a second processor, and the second processor generates an output signal to be transmitted to another unit and places the first processor in a power save mode. When the second processor places the first processor in the power save mode, the first processor becomes unable to monitor an operation of the second processor. Therefore, if an abnormality occurs in the second processor and the output signal becomes abnormal, there is a possibility that the abnormal output signal is transmitted to another unit.

A system of Patent Document 1 is provided with a flip-flop circuit that is reset by a signal from the second processor instructing the power save mode and that is set by a signal from the first processor indicating recovery from the power save mode. Furthermore, the system is provided with an AND gate, one input of which is the output of the flip-flop and the other input of which is an output signal from the second processor. Because of the flip-flop circuit and the AND gate, when the first processor is in the power save mode, the output signal from the second processor is interrupted and is prevented from being outputted to another unit.

Patent Document 1: Japanese Patent No. 4377463.

However, in Patent Document 1, the flip-flop circuits and the AND gate are used to interrupt the output signal from the second processor as described above. Therefore, a circuit configuration for interrupting the output signal is complicated and the cost may be high. This difficulty becomes remarkable as the output signals to be transmitted from the second processor to an outside increase.

SUMMARY

The present disclosure is made in view of the foregoing. It is an object of the present disclosure to provide an electronic control unit that includes two microcomputers mutually monitoring operations each other, and that by a configuration as simple as possible, can prevent output of a signal to an external from two microcomputers during stop of a monitoring function of one of the two microcomputers.

According to an example of the present disclosure, an electronic control unit comprises a first microcomputer and a second microcomputer for mutually monitoring operations each other, an output circuit for outputting to an external apparatus a signal that is outputted from at least one of the first and second microcomputers, a power supply circuit for supplying electric power to the output circuit as operating power, and a stop unit for stopping supply of the electric power from the power supply circuit to the output circuit. At least one of the first and second microcomputers is a subject microcomputer, which has operation modes including a normal mode and a low power mode smaller in electric power consumption than the normal mode. In the low power mode, the subject microcomputer stops monitoring the operation of a counterparty microcomputer, which is the first and second microcomputers other than the subject microcomputer, and outputs a power supply stop signal that operates the stop unit to stop the supply of the electric power from the power supply circuit to the output circuit.

Specifically the electronic control unit comprises the stop unit for stopping the power supply circuit from supplying the electric power to the output circuit. When at least one microcomputer becomes the low power mode, the power supply stop signal is outputted to operate the stop unit. When the microcomputer is in operation in a normal mode, this stop unit allows supply of electric power from the power supply circuit to the output circuit. When the microcomputer starts operating in the low power mode, the stop unit interrupts this supply of electric power. Therefore, unlike Patent Document 1, a flop-flip circuit is not required and a circuit configuration is not complicated.

Moreover, the supply of electric power to the output circuit, which outputs to an external apparatus a signal that is outputted from at least one of the first and second microcomputers, is stopped by the stop unit. In other words, when the output circuit is provided for a microcomputer that outputs the power supply stop signal when becoming the low power mode, the supply of electric power to this output circuit is stopped by the stop unit.

Therefore, when an abnormality occurs in a microcomputer and the microcomputer outputs the power supply stop signal even though the microcomputer is in operation in the normal mode, a signal output from the microcomputer having the abnormality to an external apparatus is prevented.

Additionally, when the output circuit is provided for a counterparty microcomputer being a counterparty of the microcomputer that outputs the power supply stop signal when becoming the low power mode, the supply of electric power to this output circuit is stopped by the stop unit.

Therefore, a signal output to an external apparatus from the counterparty microcomputer, whose operation is not monitored, is prevented.

Furthermore, when the output circuits are provided for both of the first and second microcomputers, the supply of electric power to each of the output circuits is stopped by the stop unit.

The above advantage becomes remarkable in particular when the total number of output circuits increases because a circuit for interrupting a signal needs not to be provided for each individual output circuit.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (First Embodiment)

Figure 1:
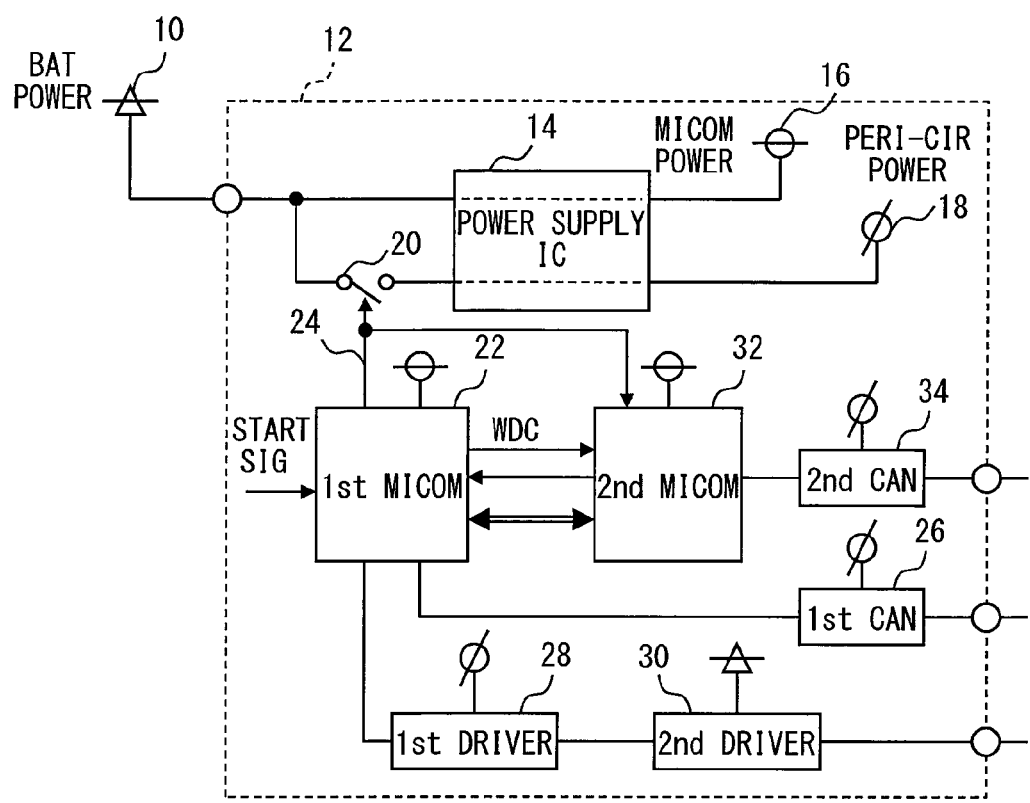
FIG. 1 is a diagram illustrating an electronic control unit of a first embodiment.

An electronic control unit of a first embodiment will be illustrated with reference to the drawings. FIG. 1 is a diagram illustrating an electronic control unit of a first embodiment. In the present embodiment, an electronic control unit 12 is used to control a control subject apparatus mounted to a vehicle. The electronic control unit 12 operates by being supplied with battery power 10 of the vehicle.

As shown in FIG. 1, the electronic control unit 12 includes a power-supply IC 14 as a power supply circuit. Based on the battery power 10, the power-supply IC 14 generates a microcomputer-used power 16 for operating first and second microcomputers (MICOM) 22 and 32 and supplies it to each of the microcomputers 22 and 32. Furthermore, the power-supply IC generates a peripheral-circuit-used power 18 for operating peripheral-circuits such as first and second CAN communication interfaces (CANIF) 26, 34, a driver circuit 28 and the like, and supplies it to each peripheral-circuit.

A power supply line supplying the battery power 10 to the power-supply IC 14 branches into a power supply line for generating the microcomputer-used power 16 and a power supply line for generating the peripheral-circuit-used power 18. The power supply line for generating the microcomputer-used power 16 always supplies the battery power 10 to the power-supply IC 14. Therefore, regardless of ON and OFF of an ignition switch, the power-supply IC can always generate the microcomputer-used power 16. A switch element 20 corresponding to an example of stop unit and stop means is inserted in the power supply line for generating the peripheral-circuit-used power 18. For this reason, only when the switch element 20 is ON, the power-supply IC 14 can generate the peripheral-circuit-used power 18. The switch element may be inserted in the power supply line on a low potential side of the power-supply IC 14.

The switch element 20 switches over to either one of an ON state and an OFF state by a power supply stop signal 24 outputted from the microcomputer 22. For example, the switch element 20 is ON when the power supply stop signal 24 outputted from the microcomputer 22 is at a high level (when an output of a power supply stop signal 24 is stopped). The switch element 20 is OFF when the power supply stop signal 24 outputted from the microcomputer 22 is at a low level (when a power supply stop signal 24 is being outputted).

The electronic control unit 12 of the present embodiment includes a microcomputer 22 (also called a first microcomputer) and a microcomputer 32 (also called a second microcomputer). When the ignition switch is OFF, these microcomputers 22 and 32 are supplied with the power and are operable.

For example, the electronic control unit 12 of the present embodiment is applied to what is called a hybrid vehicle, which is equipped with engine and a motor as its travel driving source and equipped with a battery for storing electric power for driving the motor. The microcomputer 22 is used, for example, as a parking lock control ECU for controlling a parking lock mechanism. In this case, when an instruction to place a gear position in a parking position is issued by an operation on a P position switch (not shown) for example, the microcomputer 22 drives a parking lock actuator to forcibly lock a link gear connected to an axle shaft. The microcomputer 22 is started up by a door open signal when an occupant opens a door to ride the vehicle for example. Upon detecting a gear shaft operation performed by the occupant, the microcomputer 22 promptly releases a parking lock.

Therefore, even when the vehicle is in the stop state where the ignition switch is OFF, the microcomputer 22 starts an operation upon satisfaction of a predetermined condition. However, if it says conversely, the microcomputer 22 does not need to perform an operation unless the predetermined condition is satisfied. For this reason, the microcomputer 22 has various operation modes including a low power mode (e.g., sleep mode, a pause mode) smaller in electric power consumption than a normal mode, in addition to a normal mode, in which various kinds of control processes are executable. The microcomputer 22 waits in the low electric power consumption mode before the predetermined condition is satisfied. When the predetermined condition is satisfied, the microcomputer 22 starts up in the normal mode. This reduces electric power consumption of the microcomputer 22 when the vehicle is in the stop state.

Moreover, the microcomputer 32 is used, for example, as hybrid ECU. In accordance with a travel state of a vehicle at a time of vehicle traveling, the microcomputer 32 determines a target torque to be generated by the engine and the motor so that energy consumption becomes minimum. The determined target torque is provided to an engine ECU and motor ECU (each not shown), and the ECUs control driving states of the engine and the motor.

These microcomputers 22 and 32 exchange data via a dedicated communication line and have a function to mutually monitor operations of their counterparties. That is, the microcomputer 22 monitors an operation of the microcomputer 32, which is a counterparty of the microcomputer 22, and the microcomputer 32 monitors an operation of the microcomputer 22, which is a counterparty of the microcomputer 22. For example, each microcomputer 22 and 32 monitors an operation of its counterparty using a watchdog timer. More specifically, each microcomputer 22 and 32 has a built-in watch dock timer and measures a time with the watchdog timer. Each microcomputer 22 and 32, when normally operating, periodically outputs a clear pulse signal (WDC signal), which clears the time measurement of the watchdog timer, to its counterparty monitoring the microcomputer 22 and 32. Therefore, as long as the microcomputer 22, 32 is normally operating, the time measured by the watch dock timer of the microcomputer (counterparty) monitoring the operation does not reach an abnormality determination time. However, when one of the microcomputers has an abnormality and becomes unable to output the WDC signal, the measured time of the watchdog timer in the other of the microcomputers is not cleared and reaches the abnormality determination time. In this case, the other of the microcomputers attempts to recover the one of the microcomputers from the abnormal state by resetting the one of the microcomputers.

It is noted that a manner for the microcomputers 22 and 32 to mutually monitor operations of their counterparties is not limited to the above-described manner using the watchdog timer function. For example, the following manner may be used. Each microcomputer 22 and 32 may make a predetermined inquiry to its monitoring subject microcomputer. When the microcomputer receives a response matching the inquiry, the microcomputer may determine that the monitoring subject microcomputer is normally operating. When a response matching the inquiry is absent, the microcomputer may determine that the monitoring subject microcomputer has an abnormality.

The CANIF 26 and 34 are communication interfaces for the corresponding microcomputers 22 and 32 to communicate with other ECUs according to a CAN (Controller Area Network) protocol. Based on a signal outputted from the microcomputer 22, first and second driver circuits 28 and 30 generate a driving signal for driving an external apparatus, which is for example the actuator of the parking lock mechanism. That is, since the microcomputer 22 is capable of sending a load current enough to directly drive the external apparatus, the lack of this capability is compensated using the driver circuits 28 and 30. The CANIF 26, 34 is supplied with the peripheral-circuit-used power 18 as its operating power. The driver circuit 30 is supplied with the battery power 10 as its operating power.

Next, processes executed by the microcomputers 22 and 32 of the electronic control unit 12 will be described with reference to flowcharts of FIG. 2 and FIG. 3.

Figure 2:
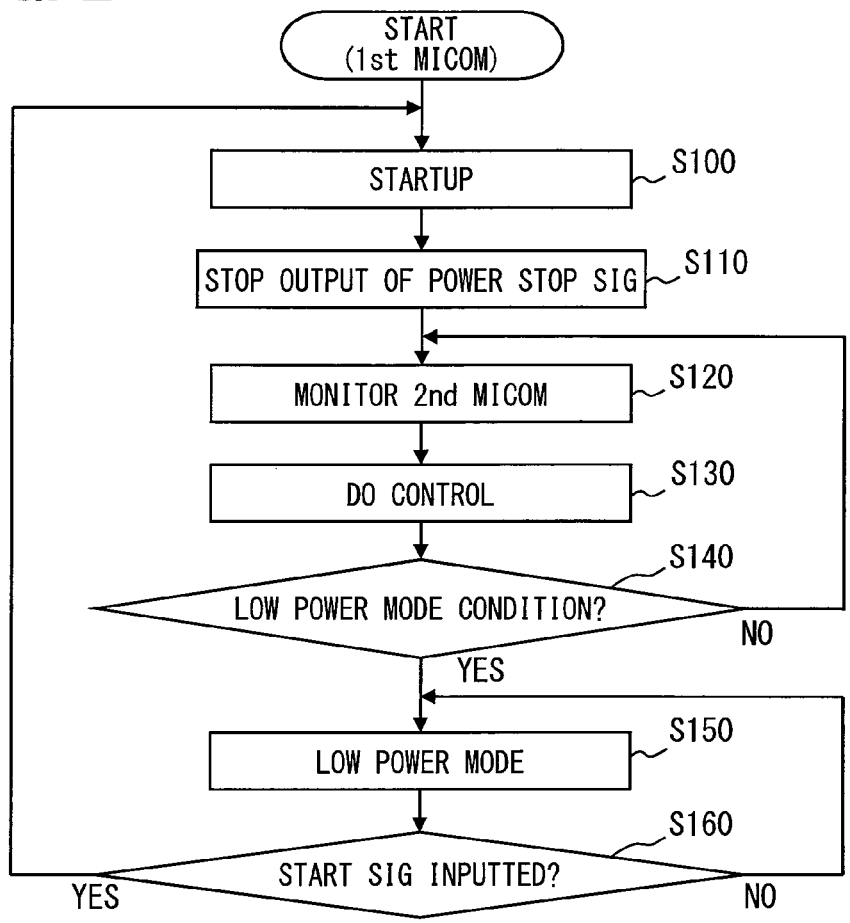
FIG. 2 is a flow chart illustrating processes executed by a first microcomputer of the first embodiment.
Figure 3:
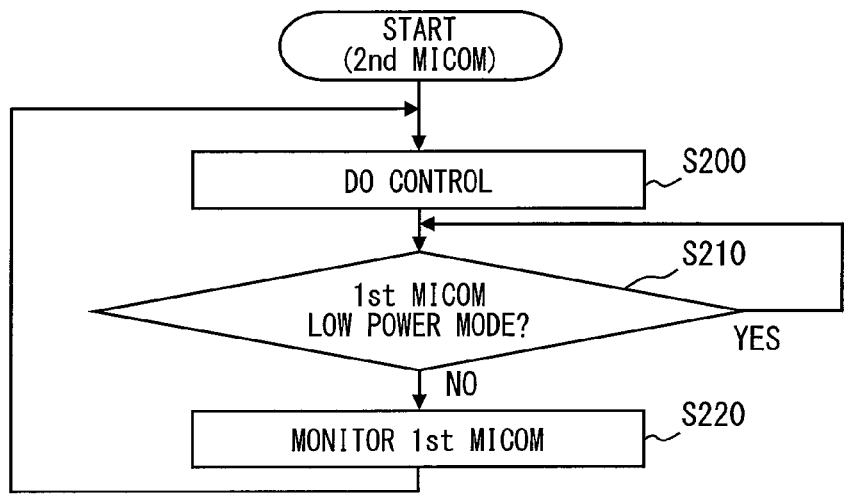
FIG. 3 is a flow chart illustrating processes executed by a second microcomputer of the first embodiment.

As shown in the flow chart of FIG. 2, the microcomputer 22 performs a recovery process to recover from low power mode to the normal mode at S100. For example, in the low power mode, the supply of the electric power supply to at least some circuits of the microcomputer 22 is stopped; thus, at S100, the supply of the electric power is restarted and necessary data is stored in a RAM or a register. It is noted that even when the microcomputer 22 has an abnormality and is reset by the microcomputer 32, the processing is also started from this S100.

At S110, the microcomputer 22 stops outputting the power supply stop signal 24. Specifically, in the low power mode, the microcomputer 22 outputs the power supply stop signal 24 having the low level, so that the switch element 20 is OFF. In the processing at S110, the signal level of the power supply stop signal 24 is changed over from the low level to the high level. This stops the output of the output of the power supply stop signal 24 and turns on the switch element 20, and as a result, the power-supply IC 14 becomes able to generate the peripheral-circuit-used electric power 18. Accordingly, the CANIF 26, 34 and the driver circuit 28, which are supplied with the peripheral-circuit-used electric power 18 and serve as output circuits, becomes operable.

At S120, the microcomputer 22 executes a monitoring process of monitoring the microcomputer 32 by using, for example, the watchdog timer mentioned above. In this monitoring process, when the microcomputer 22 determines that an abnormality occurs in the microcomputer 32, the microcomputer 22 outputs a reset signal to the microcomputer 32 to attempt normal return of the microcomputer 32. A S130, the microcomputer 22 executes a control process of controlling the control subject, which is, for example, the parking lock mechanism. For example, when the parking lock mechanism is designated as the control subject, the microcomputer 22 determines whether a condition for performing the parking lock is met. When the condition is met, the microcomputer 22 outputs the drive signal so that the actuator is driven to perform the parking lock. Furthermore, the microcomputer 22 determines whether or not a condition for releasing the parking lock is met. When the condition is met, the microcomputer 22 outputs the drive signal so that the actuator is driven to release the parking lock.

At S140, the microcomputer 22 determines whether or not a condition for the operation mode of the microcomputer 22 to transition from the normal mode to the low power mode is met. For example, it is determined that the condition for transitioning to the low power mode is met, when: the control process to be executed by the microcomputer 22 is ended; the microcomputer 22 receives information from the microcomputer 32 indicating that there is no process to be executed; and no communication is being performed via the CANIF 26. When the condition for transitioning to the low power mode is not met, the microcomputer 22 returns to processing S120. When the condition for transitioning to the low power mode is not met, the microcomputer 22 proceeds to processing S150.

At S150, the microcomputer 22 becomes the low power mode. In this low power mode, the power supply stop signal 24 having the low level is outputted, as mentioned above. Additionally, the supply of electric power to at least some circuits is stopped, so that the power consumption of the microcomputer 22 is suppressed. In addition, in this low power mode, the microcomputer 22 executes neither the control process of controlling the control subject nor the monitoring process of monitoring the microcomputer 32.

At S160, the microcomputer 22 determines whether or not a startup signal is inputted to the microcomputer 22. This startup signal may be, for example, the above mentioned door open signal. When the startup signal is inputted, the processing is started from S100. When the startup signal is not inputted, the low power mode of the microcomputer 22 is maintained. In the above flow, the microcomputer 32 may determine or detect that the condition for startup of the microcomputer 22 is met, and the microcomputer 32 may instruct the microcomputer 22 to start up.

Next, processes executed by the microcomputer 32 are explained with reference to the flowchart of FIG. 3.

At S200, the microcomputer 32 performs a control process of controlling a control subject. For example, when the microcomputer 32 is used as the hybrid ECU, the microcomputer 32 determines the target torque to be generated by the engine and the motor according to the traveling state of the vehicle. The determined target torque is transmitted to the engine ECU and the motor ECU through the CANIF 34. In this regard, when the vehicle is stopped and the ignition switch is turned off, the process to be executed for the control subject by the microcomputer 32 disappears in principle.

At S210, the microcomputer 32 makes a determination of whether or not the microcomputer 22 becomes the low power mode. The microcomputer 32 makes this determination in, for example, such a manner that the microcomputer 32 acquires the power supply stop signal outputted from the microcomputer 22 and determines based on the acquired power supply stop signal whether or not the microcomputer 22 becomes the low power mode. Alternatively, through communicating with the microcomputer 22, the microcomputer 32 may acquire information indicating that the microcomputer 22 becomes the low power mode and outputs the power supply stop signal. When it is determined that the microcomputer 22 becomes the low power mode, S210 is repeated to wait for the microcomputer 22 to return to the normal mode. When it is determined that the microcomputer 22 does not become the low power mode, the microcomputer 32 proceeds to S220. At S220, the microcomputer 32 executes a monitor process of monitoring the microcomputer 22. That is, only when the microcomputer 22 is operating in the normal mode, the microcomputer 32 performs the monitoring process of monitoring the microcomputer 22. This is because when the microcomputer 22 becomes the low power mode, the microcomputer 22 stops the control process of controlling the control subject and the like, it becomes unnecessary to monitor the operation of the microcomputer 22. In the above flow, when the microcomputer 22 transitions to the low power mode, the microcomputer 32 may also transition to the low power mode.

Next, technical effects of the electronic control unit 12 of the present embodiment will be explained.

When the microcomputer 22 becomes the low power mode and outputs the power supply stop signal 24, the microcomputer 32 stops the monitoring process of monitoring the microcomputer 22. For this reason, one may suppose that when, although operating in the normal mode, the microcomputer 22 erroneously outputs the power supply stop signal 24 due to occurrence of an abnormality in the microcomputer 22, it is impossible to detect the abnormality of the microcomputer 22.

In the present embodiment, however, when the microcomputer 22 outputs the power supply stop signal 24, the switch element 20 is turned off, and as a result, the power-supply IC 14 becomes unable to generate the peripheral-circuit-used electric power 18. Accordingly, the supply of electric power to the CANIF 26, 34, and the driver circuit 28 is stopped, and operations of the CANIF 26, 32 and the driver circuit 28 are stopped.

Therefore, when an abnormality occurs in the microcomputer 22 and the power supply stop signal 24 is erroneously outputted, a signal outputted from the microcomputer 22 is prevented from flowing to an external. Specifically, the output of the drive signal from the driver circuit 28 for driving an external apparatus based on the signal outputted from the microcomputer 22 is interrupted. Moreover, transmission of an abnormal signal from the microcomputer 22 to an external ECU via the CANIF 26 is prevented.

Moreover, when the microcomputer 22 becomes low power mode, the microcomputer 22 stops the monitoring process of monitoring the microcomputer 32. Because of this, even when an abnormality occurs in the microcomputer 32, it becomes impossible to detect this abnormality. Even in this situation, since the CANIF 34 connected to the microcomputer 32 stops operating, transmission of an abnormal signal from the microcomputer 32 to an external ECU may be prevented.

Furthermore, in the present embodiment, supply and stop of electric power to multiple circuits including the CANIF 26, 34 and the driver circuit 28 can be collectively managed using the switch element 20. Therefore, even when the total number of circuits for outputting signals of the microcomputers 22 and 32 increases, the flow of an abnormal signal to an external can be reliably prevented by such an extremely simple configuration that the switch element is inserted in the power supply line of the power-supply IC 14.

(Second Embodiment)

Next, an electronic control unit of a second embodiment will be explained. The same references are used to refer to configurations similar to those in the first embodiment, so that duplicated explanations will be omitted.

In the first embodiment, the microcomputer 22 in the low power mode starts up by the startup signal inputted to the microcomputer 22 and starts operating in the normal mode. In the present embodiment, the microcomputer 22 in the low power mode starts up by a startup signal transmitted from an external ECU.

Figure 4:
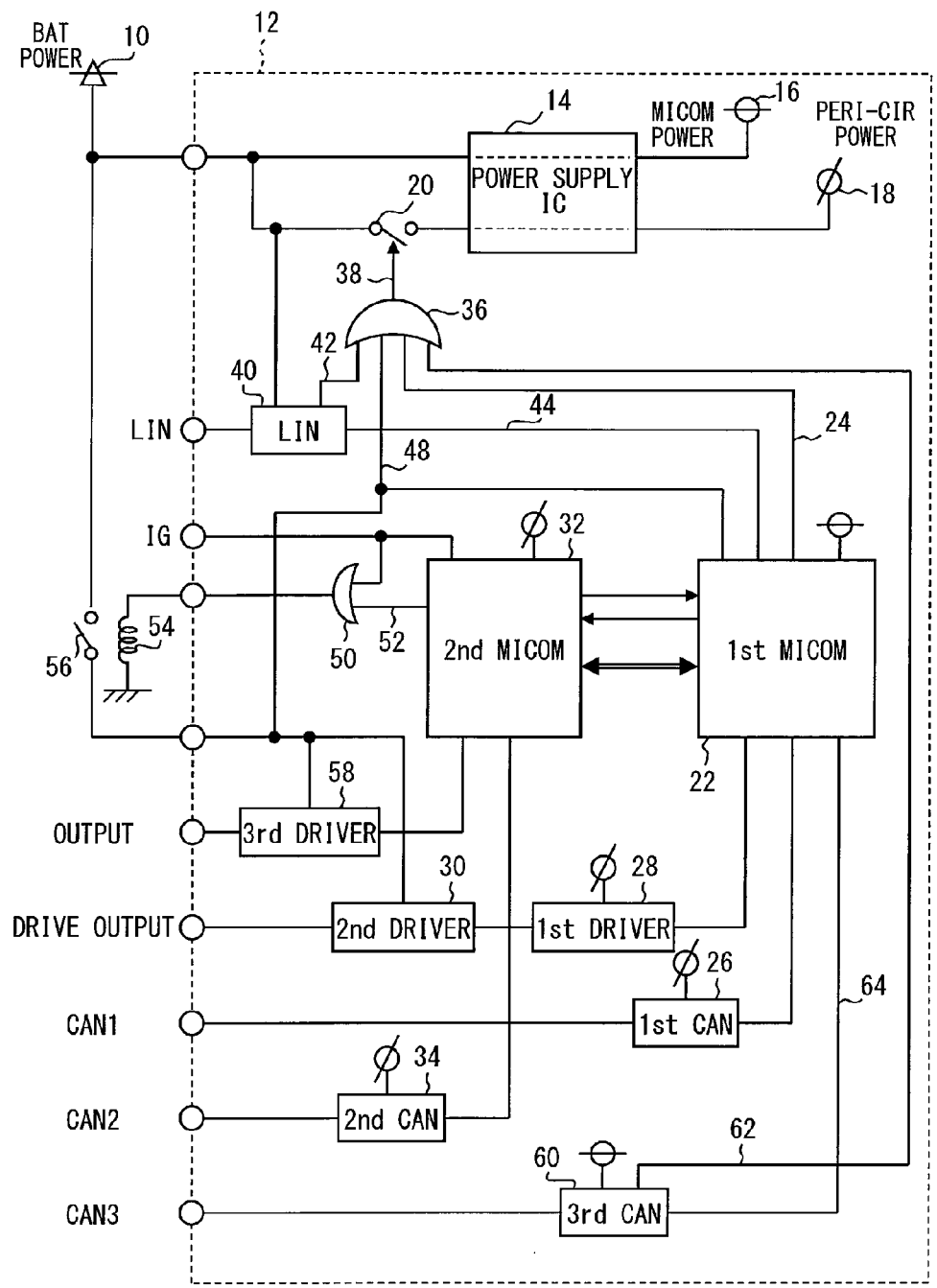
FIG. 4 is a diagram illustrating an electronic control unit of a second embodiment.

FIG. 4 is a diagram illustrating an electronic control unit of the present embodiment. As shown in FIG. 4, the electronic control unit 12 of the present embodiment includes a LIN (Local Interconnect Network) communication interface 40 and a third CANIF 60. The LIN communication interface 40 abbreviated as LINIF 40 is supplied with electric power from the battery power 10. The CANIF 60 is supplied with electric power from the microcomputer-used power 16. Therefore, through the LINIF 40, the CANIF 26 and the CANIF 60, the microcomputer 22 can perform communication with external ECUs connected to respective networks.

Even when the microcomputer 22 is in the low power mode, the LINIF 40 and the CANIF 60 continue to be supplied with electric power and are operable, so that the LINIF 40 and the CANIF 60 can receive communication data as the startup signal from an external ECU. Each of the LINIF 40 and the CANIF 60 includes therein a latch circuit, which latches the startup signal upon receipt of the startup signal from an external ECU. When the latch circuits latch the startup signal, the latch circuits output startup signals 42, 62 having a high level. Furthermore, even when a significant signal to be outputted to an external is outputted from the microcomputer 22, this signal is latched by the latch circuits of the LINIF 40 and the CANIF 60 and the startup signals 42, 62 having a high level are outputted.

These startup signals 42 and 62 are inputted to an OR gate 36. Moreover, when the LINIF 40 and CANIF 60 receive the startup signal from an external, the LINIF 40 and CANIF 60 output this startup signal to the microcomputer 22 through signal lines 44 and 64. Accordingly, the microcomputer 22 recovers from the low power mode and starts up in the normal mode.

The power supply stop signal 24 from the microcomputer 22 and the below described voltage detection signal 48, which depends on a voltage level of a power supply line to the second driver circuits 30 and a third driver circuit 58, are inputted to the OR gate 36, in addition to the startup signals 42 and 62 from the LINIF 40 and the CANIF 60. When at least one of these input signals becomes a high level, the OR gate 36 outputs the signal of the high level, and turns on the switch element 20. When all of the input signals are low level, the OR gate 36 outputs the signal of the low level and turns off the switch element 20. It is noted that the microcomputer 22 monitors the voltage detection signal 48.

Moreover, the electronic control unit 12 of the present embodiment includes an OR gate 50 to which an IG signal from the ignition switch and a relay ON signal 52 outputted from the microcomputer 32 are inputted. This OR gate 50 outputs a coil driving signal when the ignition switch is turned on or the relay ON signal 52 is outputted from the microcomputer 32.

The output of the OR gate 50 is connected to a relay coil 54. The relay coil 54 turns on the relay switch 56 when the coil driving signal is outputted from OR gate 50. This relay switch 56 is inserted in a power supply line that supplies the battery power 10 to the driver circuit 30 of the microcomputer 22 and the driver circuit 58 of the microcomputer 32. Therefore, only when the relay switch 56 is ON, the driver circuits 30 and 58 are supplied with the battery power 10. Because of this, the above mentioned voltage detection signal 48 has the high level when the relay switch 56 is ON and has the low level when the relay switch 56 is OFF.

In some cases, even after an ignition switch is turned off, the microcomputer 22 and the microcomputer 32 nee to continue the processing concerning a control subject. An example of this case is that the microcomputer 22 controls the parking lock mechanism to execute the parking lot in response to turn off of the ignition switch. In this case, if the supply of electric power to the driver circuit 30 were stopped in the case of turn off of the ignition switch, the microcomputer 22 would become unable to control a parking lock mechanism. Therefore, after the ignition switch is turned off, the microcomputer 32 outputs a relay ON signal 52 to maintain the supply of electric power to the driver circuit 30 until the microcomputer 22 finishes necessary processes.

Moreover, when the control subject, which is to be controlled by the microcomputer 32, is a fan for cooling a battery, the driver circuit 58 may output a signal for driving the fan. In such a configuration, after the ignition switch is turned off, the microcomputer 32 needs to continue outputting the drive signal of the fan depending on battery temperatures in some cases. In such cases, until necessary processes are finished, the microcomputer 32 continues outputting the relay ON signal 52 to maintain the supply of electric power to the driver circuit 58.

When processes to be executed by the microcomputers 22 and 32 are completed, the microcomputer 32 ends outputting the relay ON signal 52. Thereby, the relay switch 56 is turned off and the supply of electric power to the driver circuits 30 and 58 is stopped. Accordingly, useless power consumption in the driver circuits 30 and 58 can be prevented.

Furthermore, as shown in FIG. 4, the microcomputer 32 is supplied with electric power from the peripheral-circuit-used electric power 18. Therefore, when the microcomputer 22 becomes the low power mode and the switch element 20 is turned off, the supply of electric power to the microcomputer 32 is stopped. Since it becomes unnecessary for the microcomputer 32 to monitor an operation of the microcomputer 22 when the microcomputer 22 becomes the low power mode, it is also possible to stop an operation of the microcomputer 32. In view of this, in the present embodiment, the electric power supply to the microcomputer 32 is stopped. This prevents useless power consumption in the microcomputer 32.

Next, processes executed by the microcomputers 22 and 32 of the electronic control unit 12 will be described with reference to flowcharts of FIG. 5 and FIG. 6.

Figure 5:
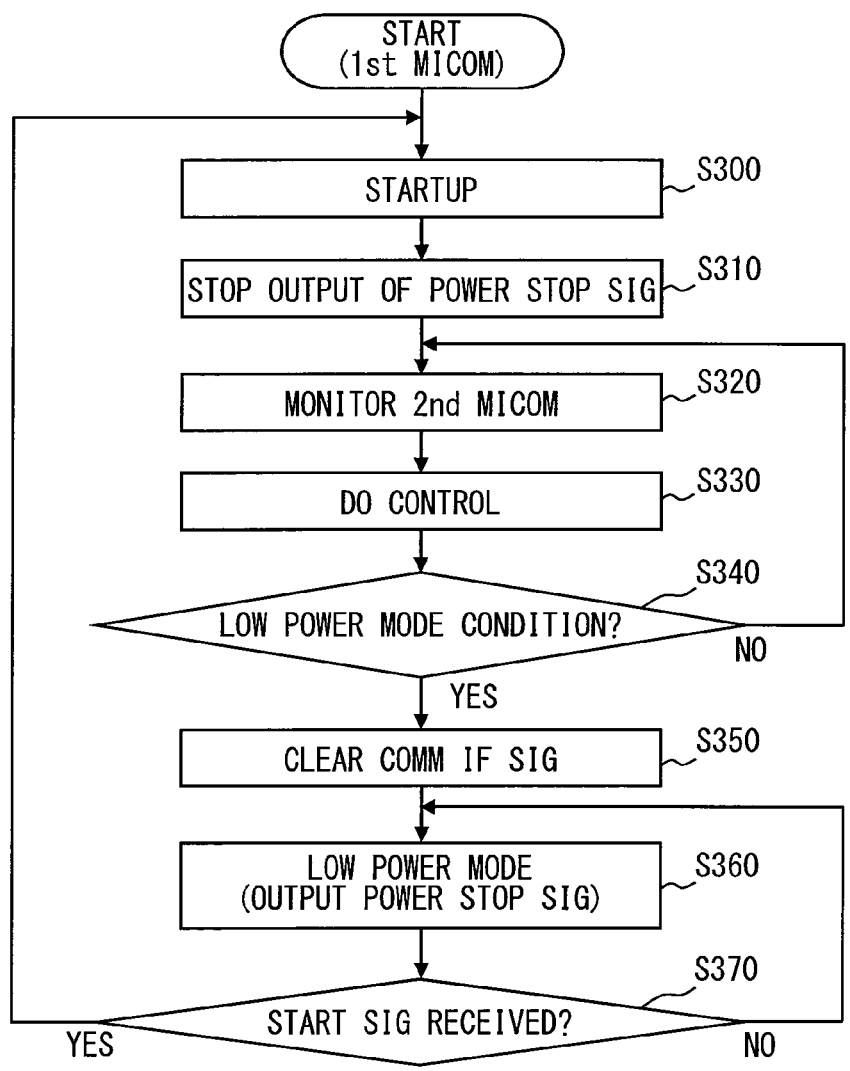
FIG. 5 is a flow chart illustrating processes executed by a first microcomputer of the second embodiment.
Figure 6:
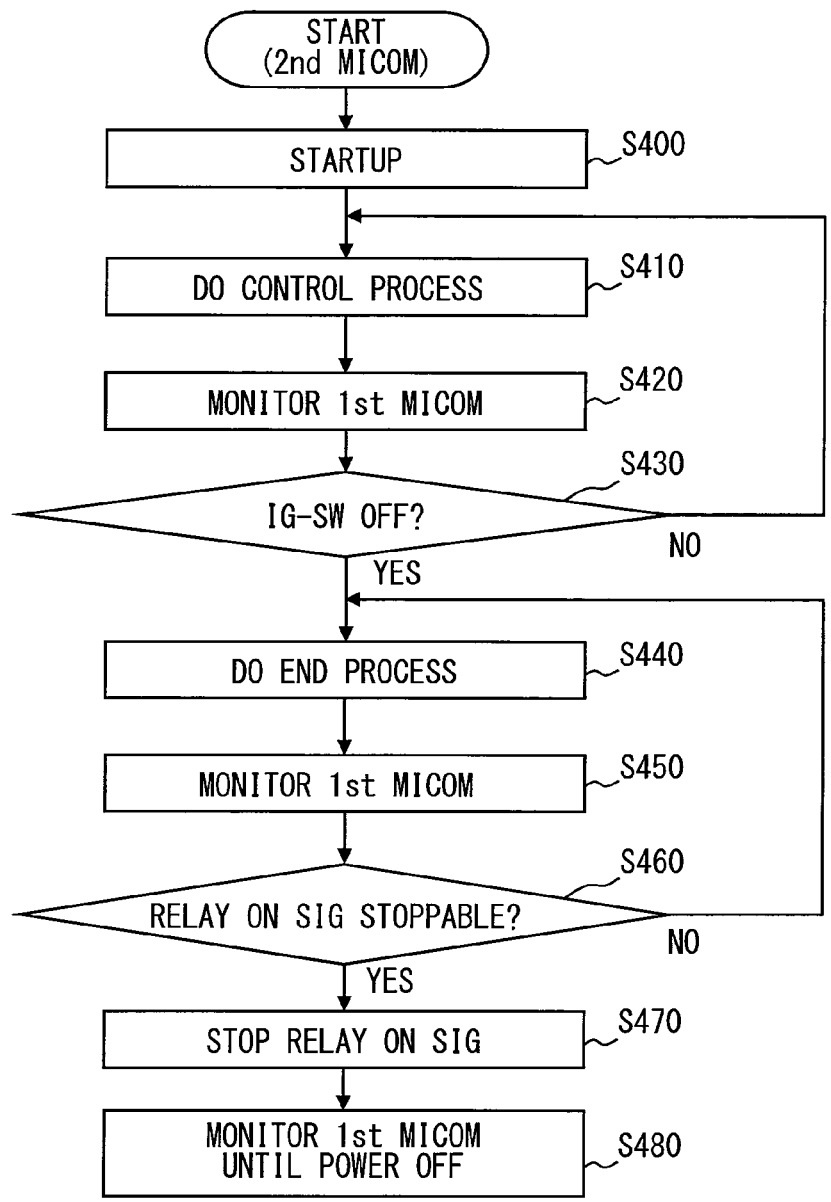
FIG. 6 is a flow chart illustrating processes executed by a second microcomputer of the second embodiment.

The flow chart of FIG. 5 illustrates processes executed by the microcomputer 22. S300 to S330 in FIG. 5 are substantially the same as S100 to S130 in FIG. 2.

At S340, it is determined whether or not a condition for the operation mode of the microcomputer 22 to transition from the normal mode to the low power mode is met. In the present embodiment, this transition condition is, for example, that, in addition to the condition of the first embodiment, the voltage of the power supply line to the driver circuits 30, 48 is 0V and the communication through the LINIF 40 and the CANIF 60 is not performed. When the condition for transitioning to the low power mode is not met, the microcomputer 22 returns to S320. When the condition for transitioning to the low power mode is met, the microcomputer 22 proceeds to S350.

At S350, the startup signals latched by the latch circuits of LINIF 40 and CANIF 60 are cleared. Accordingly, the startup signals 42 and 62 inputted to the OR gate 36 become low level signals. Additionally, at this time, the voltage detection signal 48 inputted to the OR gate 36 is also the low level (0V). Therefore, at subsequent S350, the microcomputer 22 outputs the power supply stop signal 24 with the low level, and thereby, the level of the signal outputted from the OR gate 36 changes into the low level. As a result, the switch element 20 is turned off.

At S370, it is determined whether or not the microcomputer 22 receives the startup signal through the LINIF 40 or the CANIF 60. When receiving the startup signal, the microcomputer 22 starts up and starts operating in the normal mode. In the above, on or before the microcomputer 22 starts up and stops outputting the power supply stop signal, the startup signal having the high level is inputted to the OR gate 36 due to the startup signal received by the LINIF 40 or the CANIF 60. Therefore, it becomes possible to starts supplying electric power to the microcomputer 32 and the peripheral-circuit circuit at substantially the same time as the microcomputer 22 starts startup processing.

Next, processes executed by the microcomputer 32 will be explained with reference to the flowchart of FIG. 6.

When the electric power supply is started, the microcomputer 32 first executes the startup processing at S400. At subsequent S410, the microcomputer 32 executes the control process of controlling the control subject. At S420, the microcomputer 32 executes the monitoring process of monitoring the microcomputer 22. At S430, the microcomputer 32 determines whether or not the ignition switch is turned off. When the ignition switch remains ON, processes are repeated from S410. When the ignition switch is turned off, the microcomputer 32 proceeds to S440.

At S440, the microcomputer 32 executes the above-mentioned process needed to end the control. At subsequent S450, the microcomputer 32 executes the monitoring process of monitoring the microcomputer 22. At S460, the microcomputer 32 determines whether or not the relay ON signal 52 is stoppable due to the execution of the process at S440. When it is determined that the relay ON signal 52 is stoppable, the microcomputer 32 proceeds to S470. At S470, the output of the relay ON signal 52 is stopped. Thereafter, the microcomputer 32 continues the monitoring process of monitoring the microcomputer 22 until the electric power supply is stopped at S480.

Figure 7:
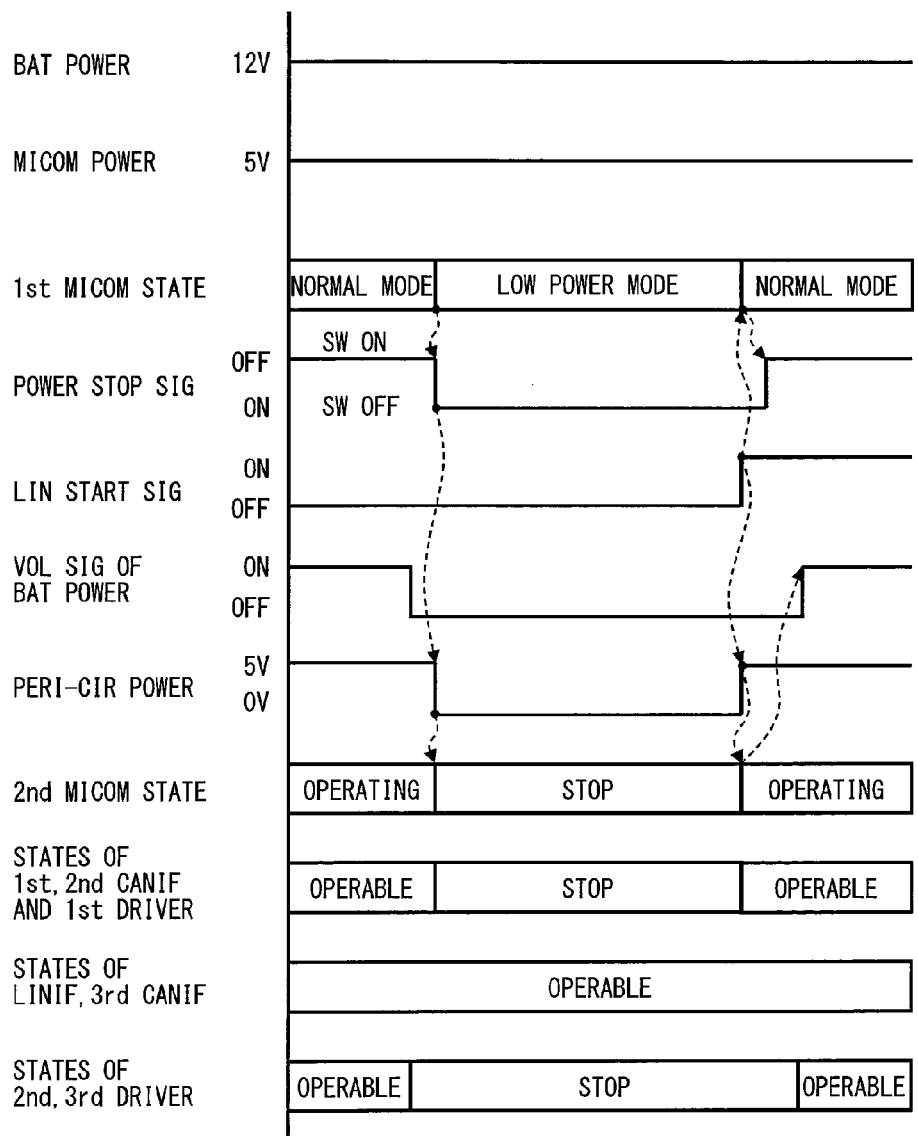
FIG. 7 is a time chart illustrating operations of parts of the electronic control unit of the second embodiment.

Operations of parts of the electronic control unit 12 of the present embodiment will be explained with reference to the time chart of FIG. 7. The time chart of FIG. 7 illustrates a case where the microcomputer 22 starts up when the LINIF 40 receives the startup signal.

At a time when necessary processes are performed after the ignition switch is turned off, the microcomputer 32 turns off the relay ON signal 52 and thereby the voltage signal 46 detected from the power supply line becomes the low level. Accordingly, the driver circuits 30 and 58, which are supplied with electric power via the power supply line, stops operating. In this state, when the condition for transitioning to the low power mode is met, the microcomputer 22 transitions to the low power mode. Because of this transition to the low power mode, the power supply stop signal 24 having the low level is outputted, and thus, the power-supply IC 14 becomes unable to generate the peripheral-circuit-used electric power 18, and the peripheral-circuit-used electric power 18 becomes 0V. Therefore, the microcomputer 32, the CANIF 26, 34 and the driver circuit 28, which operate by the peripheral-circuit-used electric power 18, stop operating.

As described above, the supply of electric power to the microcomputer 32 and the peripheral-circuit circuits 26, 28, and 34 is stopped when the microcomputer 22 becomes the low power mode, the power consumption in the electronic control unit 12 can be reduced. In this regard, however, the LINIF 40 and CANIF 60 are always supplied with electric power in order to receive a startup signal from an external ECU. The LINIF 40 and CANIF 60 are therefore operable even when the microcomputer 22 is in the low power mode.

When the LINIF 40 receives a startup signal, the LINIF 40 outputs the startup signal 42 to the OR gate 36. Because this startup signal 42 causes the switch element 20 to turn on, the power-supply IC 14 resumes generation of the peripheral-circuit-used electric power 18. At substantially the same time, the microcomputer 22 starts up due to the startup signal received by LINIF 40 and starts operating in the normal mode. For this reason, the microcomputer 22 stops outputting the power supply stop signal 24, so that the power supply stop signal 24 switches over to the high level.

Additionally, when the peripheral-circuit-used electric power 18 is supplied and the microcomputer 32 starts up, the microcomputer 32 outputs the relay ON signal 52 in order to enable the output of the drive signal to the control subject. Thereby, the relay switch 56 is turned on and the supply of electric power to the driver circuits 30 and 58 is started. Accordingly, the driver circuits 30 and 58 become operable.

The above electronic control unit 12 of the second embodiment can attain substantially the same technical effects as the electronic control unit 12 of the first embodiment can. In particular, in the second embodiment, when the microcomputer 22 has an abnormality and erroneously outputs the power supply stop signal 24, it becomes possible to detect the abnormality of the microcomputer 22 and attempt the recovery to normal. This point will be specifically described below.

The case where the microcomputer 22 outputs the power supply stop signal 24 and the switch element 20 is turned off is the case where the microcomputer 22 becomes the low power mode, in which the data is not typically transmitted to an external via the LINIF 40 or the CANIF 60. However, when the microcomputer 22 has an abnormality and erroneously outputs the power supply stop signal 24, there is a possibility that a significant signal to be outputted to an external is outputted to the LINIF 40 or CANIF 60 by the microcomputer 22.

When the LINIF 40 and the CANIF 60 receive from the microcomputer 22 a significant signal to be outputted to an external, the significant signal is latched by the latch circuits inside the LINIF 40 and the CANIF 60, and the startup signals 42, 62 with the high level are outputted by the LINIF 40 and the CANIF 60. In this case, the signal 38 outputted from the OR gate 36 switches into the high level. As a result, because the supply of the peripheral-circuit-used electric power 18 to the microcomputer 32 is started, the microcomputer 32 starts operating. While in operation, the microcomputer 32 always performs the monitoring process of monitoring the microcomputer 22. Therefore, when there is an abnormality in the microcomputer 22, the abnormality is discovered by the monitoring process executed by the microcomputer 32. The microcomputer 22 is reset to make an attempt to make the microcomputer 22 recover to normal.

Furthermore, according to the present embodiment, the power consumption of the electronic control unit 12 when the microcomputer 22 is placed in the low power mode can be further reduced.

In the above-illustrated embodiment, the CANIF 26, the driver 28 and the CANIF 34 can correspond to an output circuit for outputting to an external apparatus a signal that is outputted from at least one of the first and second microcomputers. The power supply IC 14 can correspond to a power supply circuit for supplying electric power to the output circuit as operating power (peripheral-circuit-used power 18). The switch element 20 can correspond to a stop unit for stopping supply of the electric power from the power supply circuit to the output circuit. The microcomputer 22 can correspond to a subject microcomputer, which has operation modes including a normal mode and a low power mode smaller in electric power consumption than the normal mode. The microcomputer 32 can correspond to a counterparty microcomputer. The microcomputer 32 performing S210 can correspond to a detection unit that detects outputting of the power supply stop signal. The LINIF 40 and the CANIF 60 can correspond to a communication interface that is supplied with electric power from other than the power supply circuit, and that is operable even when the subject microcomputer, which has the low power mode as the operation mode, is in the low power mode. The startup signals 42, 62 can correspond to a request signal, which requests release of stop of the supply of the electric power to the output circuit to resume the supply of the electric power to the counterparty interface. The relay ON signal 52 can correspond to a maintain signal for maintaining an ON state of the relay switch.

Although the embodiments are illustrated above, embodiments of the present disclosure are not limited to the above-illustrated embodiments and can have various forms within the spirit and scope of the present disclosure.

For example, in the above above-illustrated embodiments, the electronic control unit 12 is applied to a hybrid vehicle. However, an object to which the electronic control unit 12 is applied is not limited to a hybrid vehicle. The electronic control unit 12 may be used for other applications.

What is claimed is:

1. An electronic control unit comprising:
   a first microcomputer and a second microcomputer for mutually monitoring operations each other;
   an output circuit for outputting, to an external apparatus, a signal that is outputted from at least one of the first and second microcomputers;
   a power supply circuit for supplying electric power to the output circuit as operating power; and
   a stop unit for stopping supply of the electric power from the power supply circuit to the output circuit;
   a subject microcomputer that is at least one of the first microcomputer and the second microcomputer, and that has operation modes including a normal mode and a low power mode smaller in electric power consumption than the normal mode;
   a counterparty microcomputer that is at least one of the first microcomputer and the second microcomputer other than the subject microcomputer and that is supplied with operating power from the power supply circuit; and
   a communication interface that is separated from the output circuit, that is supplied with electric power from a power source other than the power supply circuit, and that is operable even when the subject microcomputer is in the low power mode, wherein
   in the low power mode, the subject microcomputer stops monitoring the operation of the counterparty microcomputer, which is one of the first microcomputer and the second microcomputer other than the subject microcomputer, and outputs a power supply stop signal that operates the stop unit to stop the supply of the electric power from the power supply circuit to the output circuit, and
   when the power supply stop signal is outputted from the subject microcomputer in the low power mode, the stop unit stops the supply of the electric power from the power supply circuit to the counterparty microcomputer and the output circuit, and
   when a signal that is to be transmitted to an external is outputted to the communication interface from the subject microcomputer in the low power mode, the communication interface outputs a request signal to the stop unit, the request signal requesting release of the stop of the supply of the electric power from the power supply circuit to the counterparty microcomputer and the output circuit to resume the supply of the electric power from the power supply circuit to the counterparty microcomputer.

2. The electronic control unit according to claim 1, wherein:

when the counterparty microcomputer is supplied with the operating power from the power supply circuit, the counterparty microcomputer always monitors the operation of the subject microcomputer.

3. The electronic control unit according to claim 1, wherein:

when a startup signal instructing the subject microcomputer in the low power mode to start up in the normal mode is inputted to the communication interface from an external, the communication interface outputs the request signal to the stop unit to release the stop of the supply of the electric power from the power supply circuit to the output circuit.

4. The electronic control unit according to claim 1, further comprising:

a driver circuit that operates by being supplied with electric power from a battery via a relay switch, wherein:

after an ignition switch is turned off, the counterparty microcomputer outputs a maintain signal for maintaining an ON state of the relay switch; and when the maintain signal is being outputted and the driver circuit is being supplied with the electric power from the battery, the stop unit is maintained at a nonoperating state and does not stop the supply of the electric power from the power supply circuit to the output circuit.

\* \* \* \* \*